(12) United States Patent
Okai et al.

(10) Patent No.: US 7,196,463 B2
(45) Date of Patent: Mar. 27, 2007

(54) EMISSIVE FLAT PANEL DISPLAY HAVING ELECTRON SOURCES WITH HIGH CURRENT DENSITY AND LOW ELECTRIC FIELD STRENGTH

(75) Inventors: Makoto Okai, Tokorozawa (JP); Takahiko Muneyoshi, Musashimurayama (JP); Tomio Yaguchi, Sagamihara (JP); Nobuaki Hayashi, Kunitachi (JP)

(73) Assignee: Hitachi Displays, Ltd., Chiba-ken (JP)

( * ) Notice: Subject to any disclaimer, the term of this patent is extended or adjusted under 35 U.S.C. 154(b) by 167 days.

(21) Appl. No.: 10/911,601

(22) Filed: Aug. 5, 2004

(65) Prior Publication Data
US 2005/0029924 A1    Feb. 10, 2005

(30) Foreign Application Priority Data
Aug. 6, 2003    (JP)    ............... 2003-206248

(51) Int. Cl.
*H01J 1/62*    (2006.01)
*H01J 1/00*    (2006.01)

(52) U.S. Cl. ............. 313/495; 313/309; 313/310; 313/311

(58) Field of Classification Search ........ 313/309–311, 313/495–497, 351
See application file for complete search history.

(56) References Cited

U.S. PATENT DOCUMENTS

| | | | |
|---|---|---|---|
| 7,034,448 B2* | 4/2006 | Lee et al. | 313/495 |
| 2004/0150312 A1* | 8/2004 | McElrath et al. | 313/310 |
| 2005/0077811 A1* | 4/2005 | Sun et al. | 313/495 |

* cited by examiner

*Primary Examiner*—Joseph Williams
*Assistant Examiner*—Bumsuk Won
(74) *Attorney, Agent, or Firm*—Reed Smith LLP; Stanley P. Fisher, Esq.; Juan Carlos A. Marquez, Esq.

(57) ABSTRACT

The present invention provides an emissive flat panel display device which is capable of performing a gate operation at a relatively low voltage of several V to several tens V using gate electrodes. In the emissive flat panel display device which includes a back panel which is constituted of a back substrate on which cathode electrodes having electron sources formed of carbon nanotubes and gate electrodes are formed, a face panel which forms phosphors and anode electrodes thereon, and a sealing frame which seals the back panel and the face panel, the difference between an electric field strength Emax for allowing the electron sources to obtain the required maximum emission current density and an electric field strength Emin which becomes the minimum emission current density is set to $1 V/\mu m$ or less, and preferably $0.5 V/\mu m$ or less.

2 Claims, 15 Drawing Sheets

EMISSIVE FLAT PANEL DISPLAY HAVING ELECTRON SOURCES WITH HIGH CURRENT DENSITY AND LOW ELECTRIC FIELD STRENGTH

BACKGROUND OF THE INVENTION

The present invention relates to a display device which utilizes an emission of electrons into a vacuum, and more particularly, to an emissive flat panel display device including a back panel which is provided with cathode electrodes having electron sources formed of nanotube and gate electrodes which control an emission quantity of electrons from the electron sources and a face panel which is provided with phosphor layers of plurality of colors which emit light upon excitation of electrons taken out from the back panel and anode electrodes.

As a display device which exhibits the high brightness and the high definition, color cathode ray tubes have been popularly used conventionally. However, along with the recent request for the higher quality of images of information processing equipment or television broadcasting, the demand for planar display devices which are light in weight and require a small space while exhibiting the high brightness and the high definition has been increasing.

As typical examples, liquid crystal display devices, plasma display devices and the like have been put into practice. Further, particularly, as display devices which can realize the higher brightness, it is expected that various kinds of panel-type display devices including an electron emission type display device which utilizes an emission of electrons from electron sources into a vacuum and an organic EL display which is characterized by low power consumption will be commercialized soon. Here, the plasma display device, the electron emission type display device or the organic EL display device which requires no auxiliary illumination light source is referred to as a self-luminous flat panel display device or an emissive flat panel display device.

Among such flat panel display devices, as the above-mentioned field emission type display device, a display device having a cone-shaped electron emission structure which was invented by C. A. Spindt et al, a display device having an electron emission structure of a metal-insulator-metal (MIM) type, a display device having an electron emission structure which utilizes an electron emission phenomenon based on a quantum theory tunneling effect (also referred to as "a surface conduction type electron source,), and a display device which utilizes an electron emission phenomenon which a diamond film, a graphite film and nanotube represented by carbon nanotubes and the like possesses have been known.

The field emission type display device which is one example of the emissive flat panel display device is constituted by sealing a back panel which forms field-emission-type electron sources and gate electrodes which constitute control electrodes on an inner surface thereof and a face panel which includes phosphor layers of a plurality of colors and an anode electrode (an anode) on an inner surface thereof which opposingly faces the back panel while interposing a sealing frame between inner peripheries of both panels and by evacuating the inside defined by the back panel, the face panel and the sealing frame. The back panel includes a plurality of cathode lines having electron sources which extend in the first direction, are arranged in parallel in the second direction which crosses the first direction and gate electrodes which extend in the second direction and are arranged in parallel in the first direction on the back substrate which is preferably made of glass, alumina or the like. Then, in response to the potential difference between the cathode electrode and the gate electrode, an emission quantity (including ON and OFF) of electrons from the electron sources is controlled.

Further, the face panel includes phosphor layers and an anode electrode on the face substrate which is formed of a light transmitting material such as glass or the like. The sealing frame is fixedly adhered to inner peripheries of the back panel and the face panel using an adhesive material such as frit glass. The degree of vacuum in the inside defined by the back panel, the face panel and the sealing frame is, for example, $10^{-5}$ to $10^{-7}$ Torr. When the field emission type display device has a large-sized display screen, both panels are fixed to each other by interposing gap holding members (spacers) between the back panel and the face panel thus holding the gap between both substrates to a given distance.

Here, as the literature which discloses a related art on the emissive flat panel display device which adopts carbon nanotubes which are a typical example of nanotubes as electron sources, many literatures are reported including "SID 99 Digest, pp. 1134–1137".

SUMMARY OF THE INVENTION

Many electron emission elements which make use of nanotubes such as carbon nanotubes and many emissive flat panel display devices which use the electron emission elements have been reported. In the above-mentioned "SID 99 Digest, pp. 1134–1137", there is disclosed an example in which an emissive flat panel display device of nominal 4.5 inches is prepared by using carbon-nanotube electron sources formed by printing. Conventionally, in the emissive flat panel display device which uses the carbon nanotubes as the electron sources, the difference (Emax−Emin) between an electric field strength Emax for obtaining the required maximum emission current density and an electric field density Emin which becomes the minimum emission current density (being defined as $\frac{1}{1000}$ of the maximum emission current density) is large, that is, 2V/μm or more and hence, even when the gate structure (the gate electrode or the control electrode) is mounted in the vicinity of the carbon nanotubes, the voltage necessary for allowing the gate electrode to perform the ON/OFF operation becomes high, that is, approximately 100V.

Particularly, when the gate electrodes are manufactured by an inexpensive coating method such as screen printing, the distance between the carbon nanotubes and the gate electrodes becomes several tens μm due to the low degree of accuracy of the printing method and hence, Emax−Emin becomes 2V/μm or more whereby the voltage necessary for the ON/OFF operation by the gate electrode (the emission control operation (gate operation)) is increased. Here, the specific numerical values used in the explanation of the present invention should not be understood in a limitative manner and include values in the vicinity of these values.

Accordingly, it is the first object of the present invention to provide an emissive flat panel display device which can perform the gate operation at a relatively low voltage of several V to several tens V using gate electrodes.

Further, conventionally, since the density of the emission site is extremely low, that is, several thousands pieces/cm², the display screen appears coarse thus providing a non-uniform display. The main reason that the density of the emission site is low is considered to lie in that although a large number of carbon nanotubes are present on a surface of the emission region, a quantity of carbon nanotubes which has a small diameter and exhibits the large electric field concentration is small.

It is the second object of the present invention to provide an emissive flat panel display device which can realize uniform display images having no coarseness by setting the density of the emission site which constitutes electron sources to one million pieces/cm$^2$ or more and preferably to ten-million pieces/cm$^2$ or more.

To achieve the above-mentioned first object, according to the present invention, using the carbon nanotube electron sources which set the difference (Emax−Emin) between the electric field strength Emax necessary for obtaining the required maximum emission current density and the electric field density Emin which becomes the minimum emission current density to 1V/μm or less, and preferably 0.5V/μm or less, the gate operation at a relatively low voltage of several V to several tens V is realized.

Further, according to the present invention, by setting the maximum emission current density to 10 mA/cm$^2$, and preferably 30 mA/cm$^2$, it is possible to make the emission current density and the electric field strength of all pixels in the display region satisfy the above-mentioned relationship.

Further, to achieve the above-mentioned second object, the present invention adopts nanotubes having the narrow diameter distribution as electron sources so as to increase the emission site density. Particularly, by setting the average density of nanotubes having the diameter in which the diameter ranges from the minimum diameter to the maximum diameter which is 1.2 times, and preferably 1.1 times as large as the minimum diameter to ten million pieces/cm$^2$ or more, it is possible to increase the emission site density to one million pieces/cm$^2$ or more, preferably ten million pieces/cm$^2$ or more.

Further, according to the present invention, the average density of the nanotubes having the diameter ranging from the minimum diameter to the maximum diameter which is 1.2 times, and preferably 1.1 times as large as the minimum diameter in the whole emission region of the pixel is set to ten million pieces/cm$^2$ or more. Still further, the pixel is formed of sub pixels of red, green and blue and the electron source of each sub pixel includes one or a plurality of emission regions.

Here, the present invention is not limited to the above-mentioned constitutions and the constitutions described in embodiments described later and various modifications are conceivable without departing from the technical concept of the present invention.

DESCRIPTION OF THE PREFERRED EMBODIMENTS

Figures 1, 2:
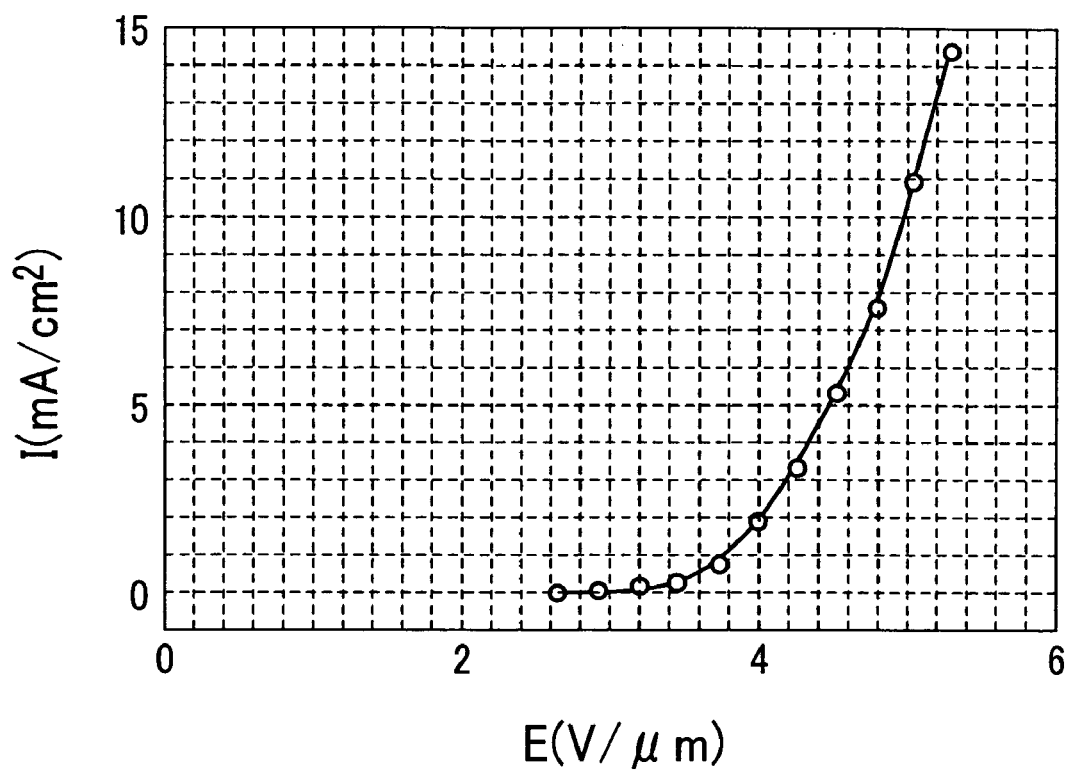
FIG. 1 is an explanatory view showing the typical relationship between an emission current density and an electric field strength of electron sources formed of carbon nanotubes.
FIG. 2 is an explanatory view showing the relationship formula of the emission current density and the electric field strength.

Hereinafter, preferred embodiments of the present invention are explained in detail in conjunction with drawings which show embodiments in which carbon nanotubes are used as electron sources. FIG. 1 is an explanatory view showing the typical relationship between an emission current density and an electric field strength of electron sources formed of carbon nanotubes, wherein the electric field strength E (V/μm) is taken on an axis of abscissas and the emission current density I (mA/cm$^2$) is taken on an axis of ordinates. For example, to realize the large-sized flat display device of so-called 40 type class, the maximum emission current density of 10 to 30 mA/cm$^2$ is necessary. In FIG. 1, to obtain the maximum emission current density of 10 mA/cm$^2$, an electric field of 5V/μm is necessary. Further, the electric field which sufficiently approaches zero when the emission current density assumes the minimum emission current density, that is, 1/1000 of the maximum emission current density is 3V/μm and the electric field strength difference is 2 V/μm.

With respect to the relationship between the emission current density and the electric field strength, the explanation is made with respect to what determines the electric field difference (Emax−Emin). FIG. 2 is an explanatory view of a formula showing the relationship between the emission current density and the electric field strength. With respect to the emission current density I, when the electric field strength E is relatively large, the inclination of graph shown in FIG. 1 is proportional to a square value of the electric field concentration coefficient γ. The electric field concentration coefficient γ is proportional to a length L of the carbon nanotubes and is inversely proportional to a diameter d of the carbon nanotubes. Accordingly, to decrease the above-mentioned electric field strength difference as much as possible, the length L of the carbon nanotubes may be set to a large value and the diameter d of the carbon nanotubes may be set to a small value. Here, φ in the formula shown in FIG. 2 is a work function and C1, C2, C3 are constants.

Figure 3:
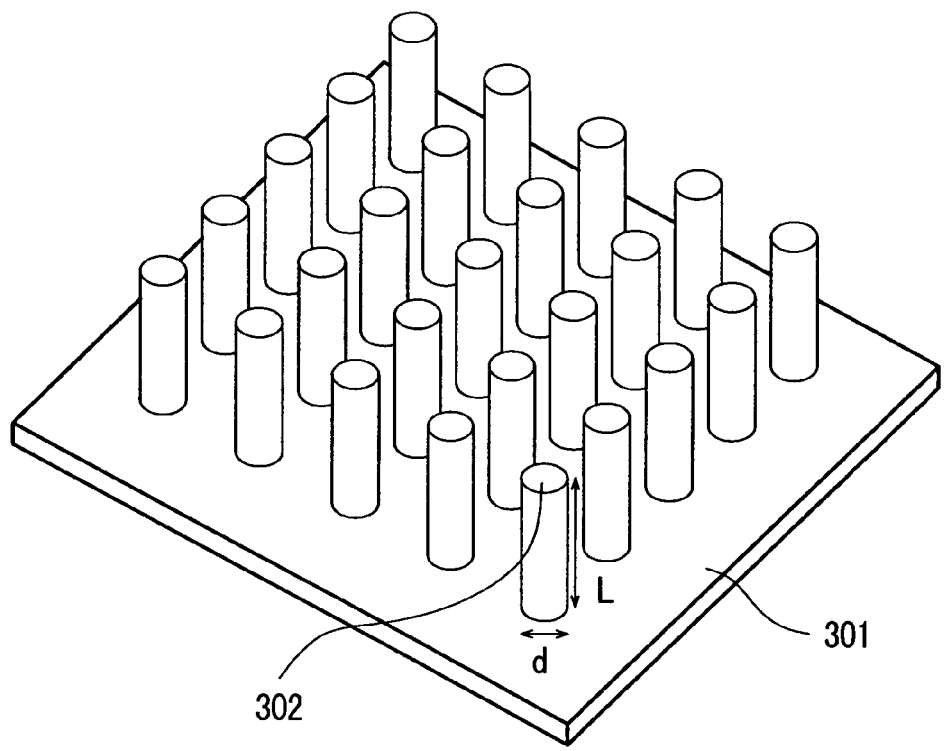
FIG. 3 is an explanatory view of an ideal arrangement of the carbon nanotubes which constitute the electron sources.

FIG. 3 is an explanatory view of the ideal arrangement of carbon nanotubes which constitute the electron sources. Reference numeral 301 indicates a substrate (to be more specific, a cathode electrode) which fixes the carbon nanotubes thereto, and numeral 302 indicates carbon nanotubes. Here, as shown in FIG. 3, it is assumed that the carbon nanotubes 302 are arranged perpendicular to the substrate 301 or the respective carbon nanotubes are spaced apart from each other with a sufficient distance compared with the diameter d of the carbon nanotubes. In the actual constitution, the carbon nanotubes 302 may be arranged obliquely with respect to the substrate 301 or may be arranged densely. However, it is considered to be generally reasonable to arrange the carbon nanotubes 302, for decreasing the electric field strength difference, such that the length L of the carbon nanotubes 302 is set to a large value, the diameter d of the carbon nanotubes is set to a small value, and a distance between the carbon nanotubes is set to a certain value or more.

According to the calculation of the electric field, it is found that when the diameter d of the carbon nanotubes 302 is 1 nm and the length L of the carbon nanotubes 302 is 1 μm, by setting the distance between the respective carbon nanotubes to 1 μm or more, the uniform electric field concentration is generated at distal ends of the respective carbon nanotubes. Here, the length L of the carbon nanotubes 302 is determined based on a length which allows the carbon nanotubes to stand by themselves, that is, a self-standing length. When the diameter d is approximately 1 nm, the self standing length is approximately 1 μm. Further, to obtain the sufficient electric field concentration, it is necessary to increase the distance between the carbon nanotubes 302 in proportion to the diameter d.

Figure 4:
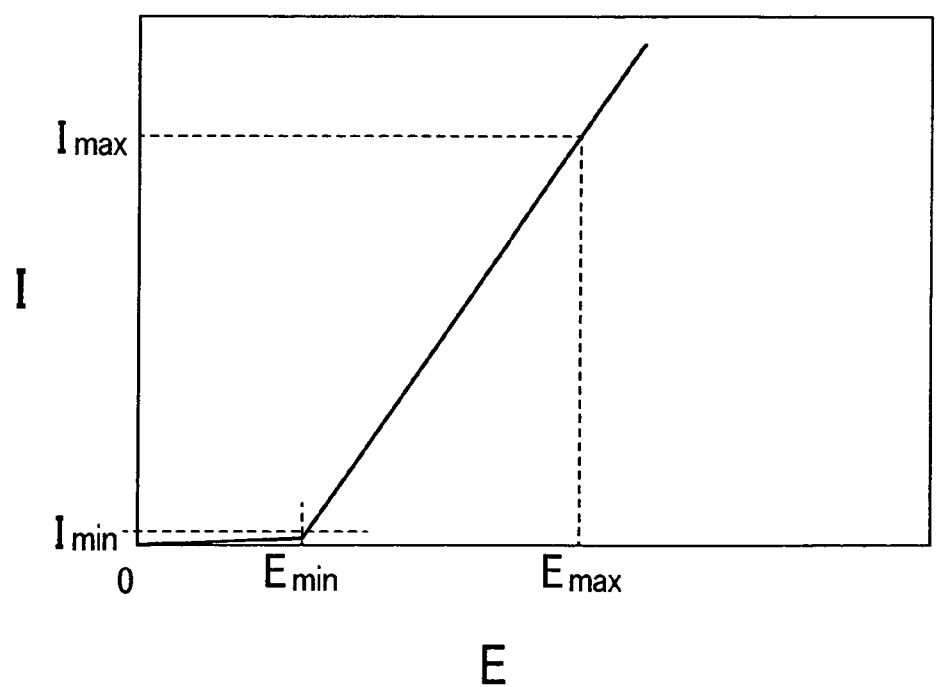
FIG. 4 is an explanatory view showing the relationship between the emission current density and the electric field strength of the carbon nanotubes electron sources.

FIG. 4 is an explanatory view showing the relationship between the emission current density and the electric field strength of the carbon nanotubes electron sources, wherein the electric field strength E (the relative value) is taken on an axis of abscissas and the emission current density I (the relative value) is taken on an axis of ordinates. The necessary maximum emission current density is set as Imax and the electric field strength to obtain the maximum emission current density is set as Emax (maximum electric field strength). Further, a value which is 1/1000 of the maximum emission current density, that is, the minimum emission current density is set as Imin and the electric field strength to obtain the minimum emission current density is set as Emin (minimum electric field strength). In this case, the relationship between the emission current density and the electric field strength of the carbon nanotubes electron sources is set as described in FIG. 4.

Figure 5:
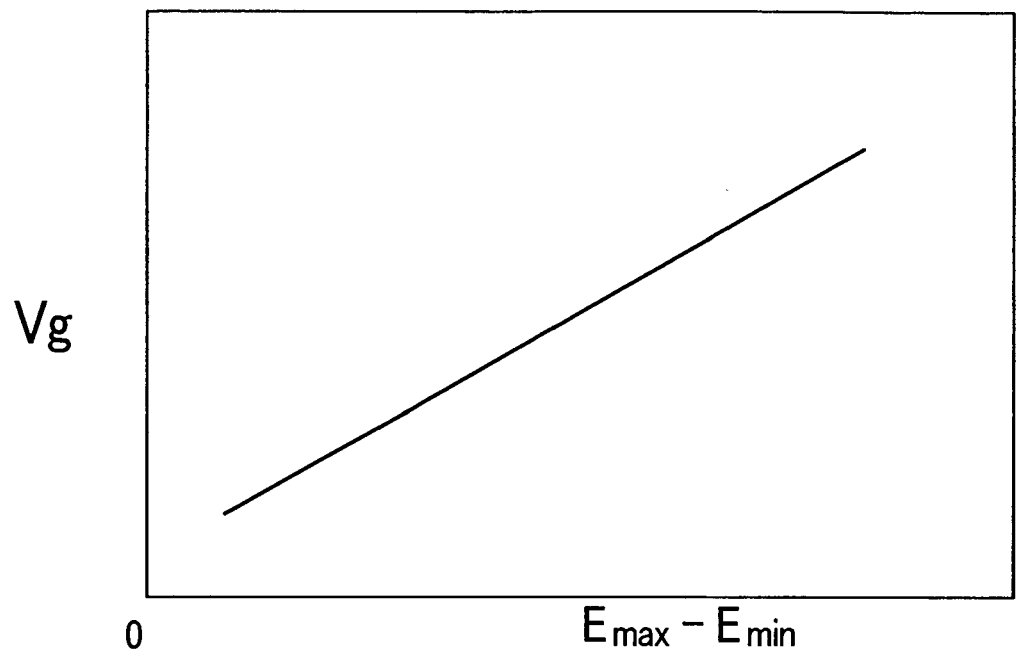
FIG. 5 is an explanatory view showing the relationship between a gate operating voltage and the difference between the maximum electric field strength and the minimum electric field strength.

FIG. 5 is an explanatory view showing the relationship between the gate operational voltage and the difference between the maximum electric field strength and the minimum electric field strength, wherein the difference (Emax−Emin) (the relative value) between the maximum electric field strength and the minimum electric field strength is taken on an axis of abscissas and the gate operational voltage Vg (the relative value) is taken on an axis of ordinates. Although the inclination of the graph shown in FIG. 5 depends on the gate structure, the inclination shows that the smaller Emax−Emin, the gate operational voltage becomes smaller.

Figure 6:
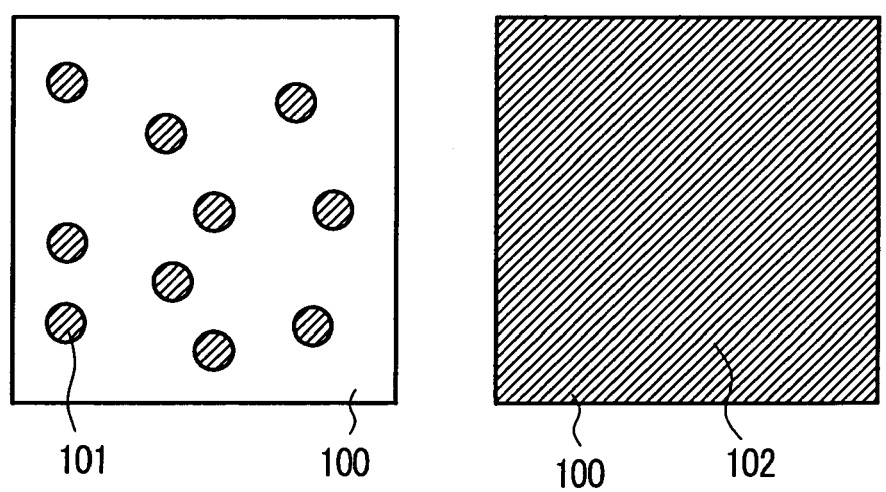
FIG. 6 is a schematic view showing a state of display of a phosphor display board due to electrons from an emission site by combining the phosphor display board with the electron sources using the carbon nanotubes as the difference of the emission site density.

Next, the relationship between the density of emission site of the electron sources using carbon nanotubes and the screen display is explained. FIG. 6 is a schematic view which shows the structure in which a phosphor display board is combined with the electron sources using the carbon nanotubes and shows that a display state on the phosphor display board generated by electrons from the emission site is expressed as the difference in the density of emission site. Reference numeral 100 in FIG. 6 indicates the phosphor display board having a size of 1 mm×1 mm, reference numeral 101 shown at the left side in FIG. 6 indicates an emission image on the phosphor display board when the emission site density is 1000 pieces/cm$^2$ (that is, 10 pieces in an area of 1 mm×1 mm), and reference numeral 102 shown at the right side in FIG. 6 indicates an emission image on the phosphor display board when the emission site density is one million pieces/cm$^2$ (that is, 1000 pieces in an area of 1 mm×1 mm). As shown in FIG. 6, to realize the uniform display, the emission site density of one million pieces/cm$^2$ or more is necessary.

Figure 7:
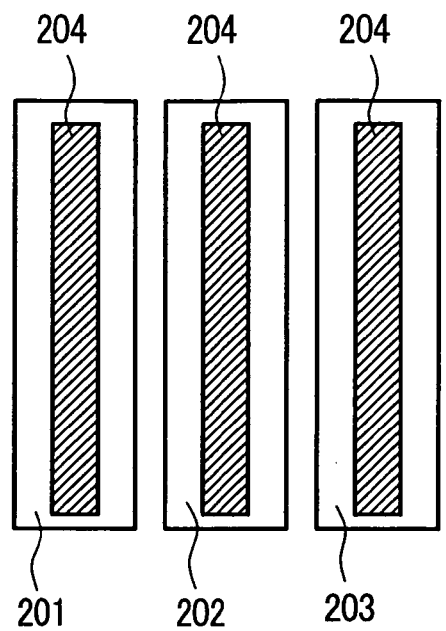
FIG. 7 is a plan view schematically showing one example of the pixel structure of the emissive flat panel display device according to the present invention.

FIG. 7 is a plan view for schematically explaining one example of the pixel structure of the emissive flat panel display device according to the present invention. FIG. 7 shows the structure of one pixel for color display, wherein a color (R) sub pixel 201, a color (G) sub pixel 202 and a color (B) sub pixel 203 constitute one color pixel. Each sub pixel includes an emission region 204 which uses carbon nanotubes as an electron source. Here, with respect to a monochromic display, each sub pixel constitutes one pixel.

Figure 8:
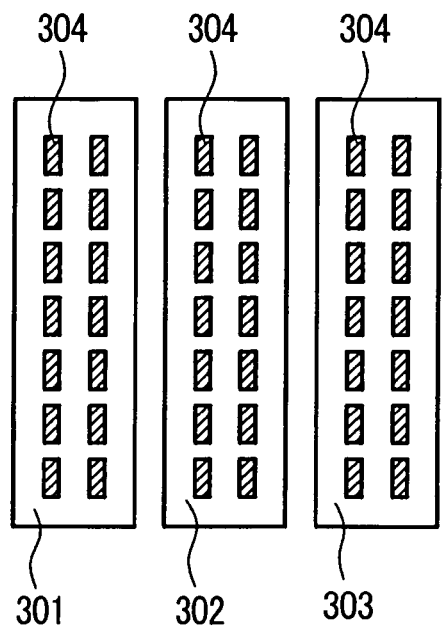
FIG. 8 is a plan view schematically showing another example of the pixel structure of the emissive flat panel display device according to the present invention.

FIG. 8 is a plan view for schematically explaining another example of the pixel structure of the emissive flat panel display device according to the present invention. FIG. 8 also shows the structure of one pixel for color display like FIG. 7. In this pixel structure, a color (R) sub pixel 301, a color (G) sub pixel 302 and a color (B) sub pixel 303 constitute one color pixel. Each sub pixel includes a plurality of emission regions 304 each of which uses carbon nanotubes as an electron source. Here, with respect to a monochroic display, each sub pixel constitutes one pixel.

Besides the structures shown in FIG. 7 and FIG. 8, it is possible to arbitrarily determine a shape of each sub pixel and the number of emission regions. Then, the respective unit areas of the emission regions 204, 304 correspond to the above-mentioned emission sites. The carbon nanotubes formed in the emission region are classified into a single-wall type and a multi-wall type.

Figure 9:
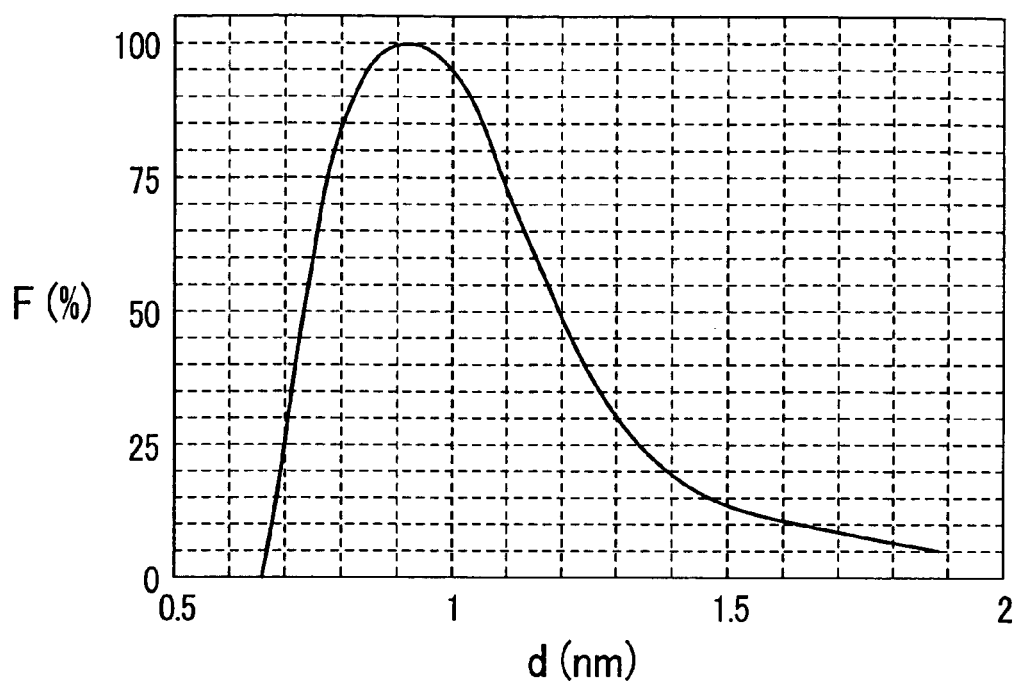
FIG. 9 is an explanatory view of diametrical distribution of single wall carbon nanotubes which constitute electron sources.

FIG. 9 is an explanatory view of diameter distribution of single-wall carbon nanotubes which constitute the electron source. The diameter d (nm) is taken on an axis of abscissas and the frequency F (%) is taken on an axis of ordinates. With respect to the single-wall carbon nanotubes, in the known preparation method, the minimum diameter is 0.7 nm (in accordance with a rule that five-membered rings are not arranged close to each other) and there is no limit with respect to the increase of the diameter and hence, the single-wall carbon nanotubes exhibit the diameter distribution shown in FIG. 9. Accordingly, with respect to the single-wall carbon nanotubes, even when the classifying treatment is not performed, provided that the density of the carbon nanotubes is ensured to some extent, it is possible to set the average density of carbon nanotubes having the diameter in which the diameter ranges from the minimum diameter to the maximum diameter which is 1.2 times (preferably 1.1 times) as large as the minimum diameter to ten million pieces/$cm^2$ or more.

Figure 10:
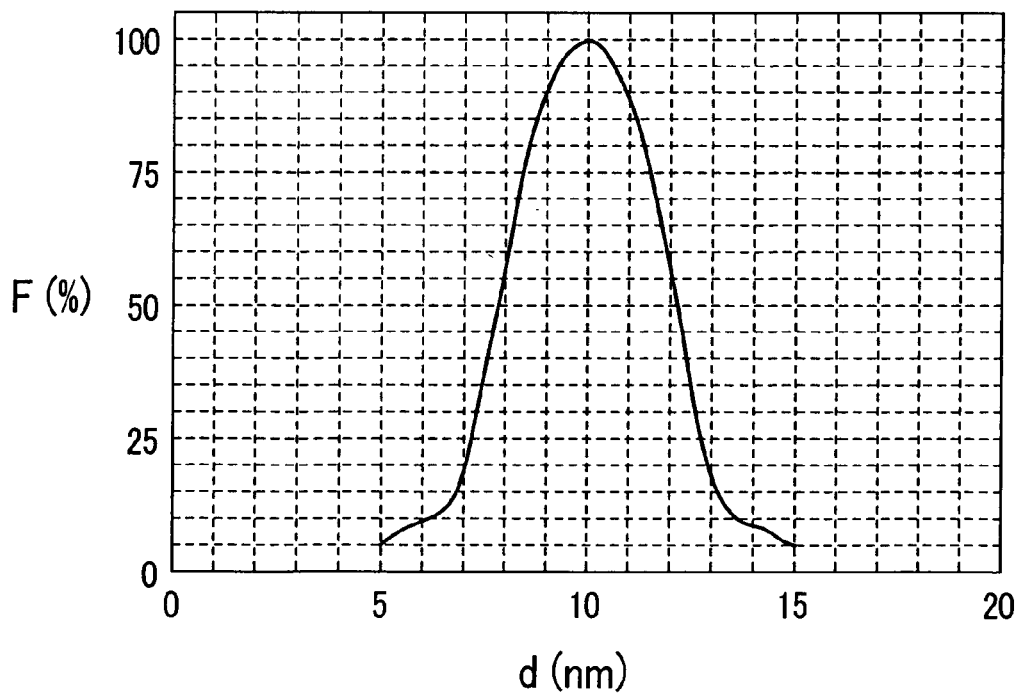
FIG. 10 is an explanatory view of diametrical distribution of multi-wall carbon nanotubes which constitute electron sources.

FIG. 10 is an explanatory view of diameter distribution of multi-wall carbon nanotubes which constitute the electron source. The diameter d (nm) is taken on an axis of abscissas and the frequency F (%) is taken on an axis of ordinates. With respect to the multi-wall carbon nanotubes, the multi-wall carbon nanotubes generally exhibit the diameter distribution which has the left-and-right symmetry. To set the average density of carbon nanotubes having the diameter in which the diameter ranges from the minimum diameter to the maximum diameter which is 1.2 times (preferably 1.1 times) as large as the minimum diameter to ten million pieces/$cm^2$ or more, it is necessary to narrow the distribution of carbon nanotubes having diameters smaller than the peak diameter of the distribution using a technique such as the filter treatment.

Figure 11:
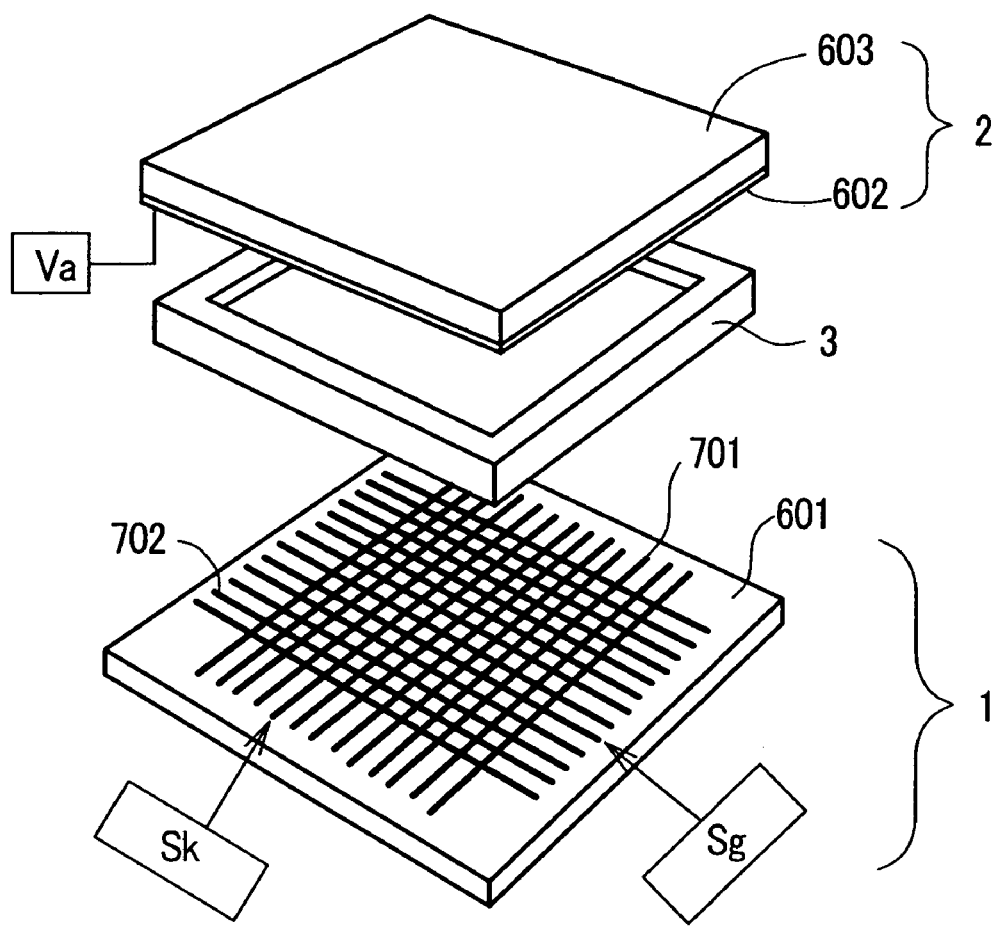
FIG. 11 is a developed perspective view as viewed from an oblique upper position showing the entire structure of the first embodiment of the emissive flat panel display device according to the present invention.
Figure 12:
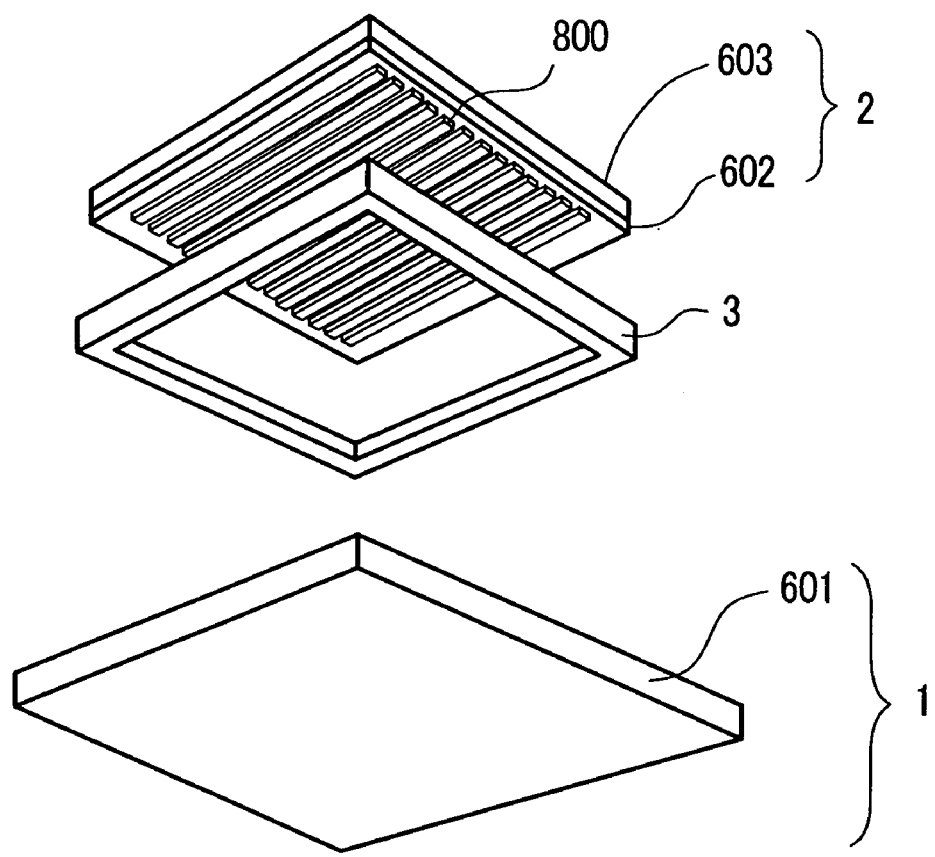
FIG. 12 is a schematic view as viewed from an oblique lower position for explaining the entire structure of the emissive flat panel display device shown in FIG. 11 in a developed form.
Figure 13:
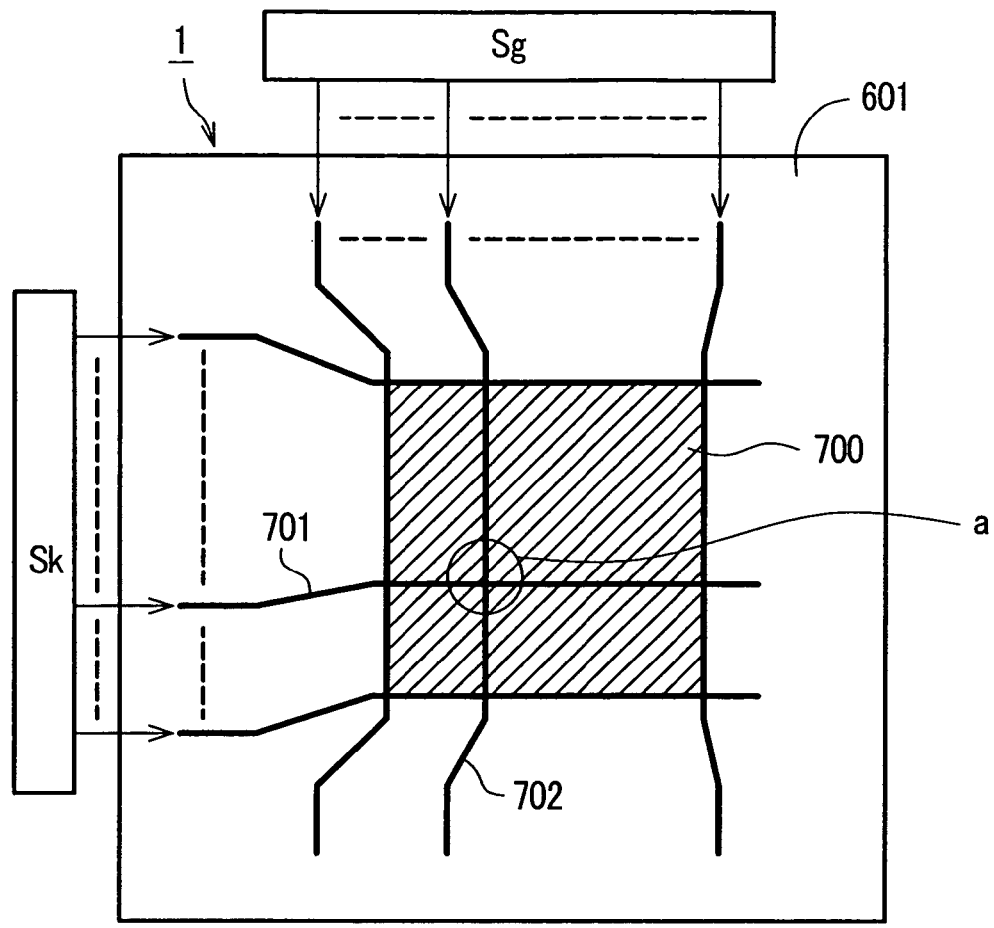
FIG. 13A and FIG. 13B are schematic explanatory views showing a constitutional example of a back panel which constitutes the emissive flat panel display device of this invention.
Figure 13:
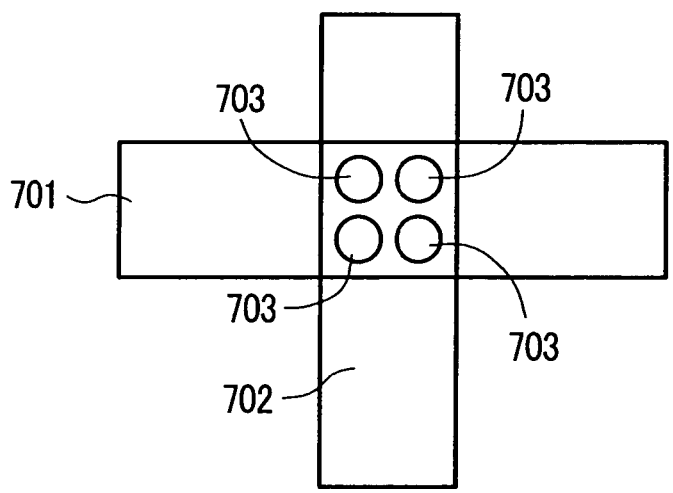
Figure 14:
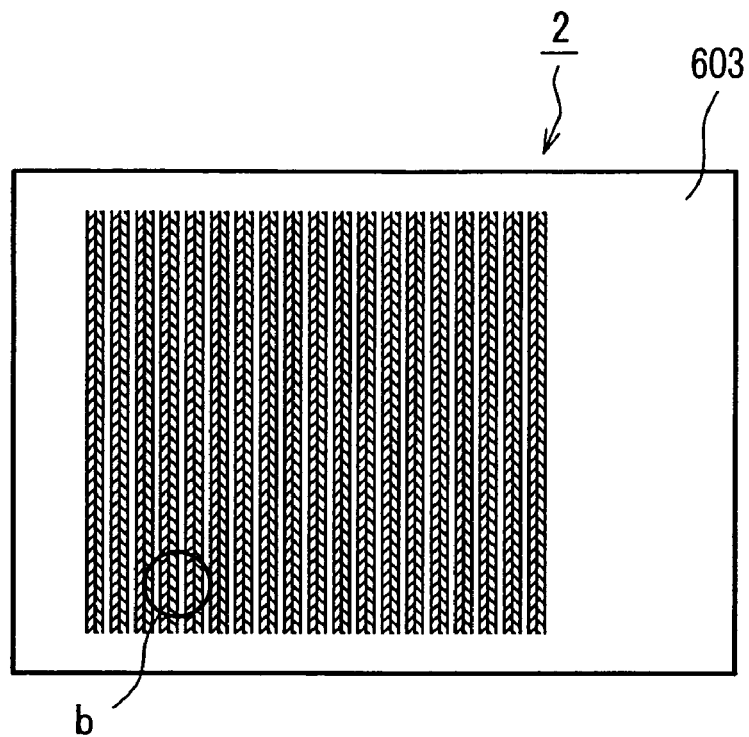
FIG. 14A and FIG. 14B are schematic explanatory views showing a constitutional example of a face panel which constitutes the emissive flat panel display device of this invention.
Figure 14:
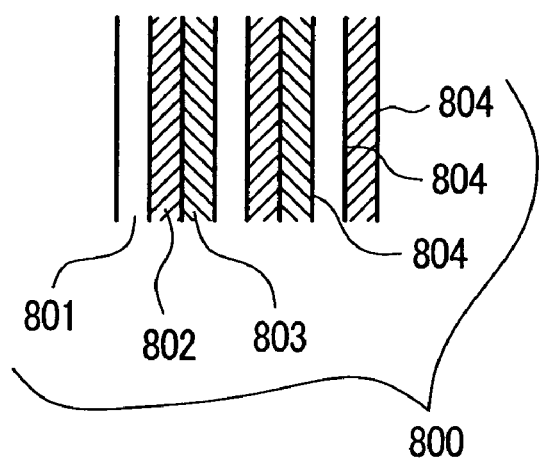

Next, the emissive flat panel display device according to the first embodiment of the present invention is explained in conjunction with FIG. 11 to FIG. 17. FIG. 11 is a developed perspective view as viewed from an obliquely above position of the whole structure of the emissive flat panel display device according to the first embodiment of the present invention. Further, FIG. 12 is a schematic view as viewed from an obliquely below position of the emissive flat panel display device shown in FIG. 11 for explaining the overall constitution of the display device in a developed form.

In FIG. 11 and FIG. 12, the emissive flat panel display device of this embodiment is formed of an integral assembled body constituted of a back panel 1 and a face panel 2 while sealing them using a sealing frame 3. The back panel 1 includes, as the electron emission and control structure, a large number of cathode electrodes 701 which extend in the first direction and are arranged in parallel in the second direction which intersects the first direction and a large number of gate electrodes 702 which extend in the second direction and are arranged in parallel in the first direction on an inner surface of a back substrate 601 preferably made of glass. A video signal Sk is applied to the cathode electrodes 701 and a selection signal Sg is applied to the gate electrodes 702.

The face substrate 603 which constitutes a face panel 2 is preferably made of transparent glass. To an inner surface of the face substrate 603, a plurality (here, three colors consisting of red (R), green (G), blue (B)) of phosphor layers 800 are applied in the first direction in a stripe shape, and an anode electrode 602 which forms an aluminum film having a film thickness of several tens to several hundreds nm thereon by vapor deposition as a transparent conductive film is formed on entire surfaces of the phosphor layers. An acceleration voltage Va is applied to the anode electrode 602. The phosphor layers 800 are not limited to a stripe shape shown in the drawing and may be formed in dot shapes for respective colors. Here, the sealing frame 3 has a function of holding the inside formed by laminating the back panel 1 and the face panel 2 in a vacuum state and, at the same time, a function of maintaining a gap between opposingly facing surfaces at a given value. Further, when a screen size is large, the gap defined between the oppositely facing surfaces can be held at a given value by interposing spacers which are formed of glass beads, plastic beads or columnar spacers made of resist which are formed by a photolithography method between both panels which are sealed by the sealing frame 3. The sealing frame 3 is also preferably formed of glass.

FIG. 13A and FIG. 13B are schematic explanatory views of a constitutional example of the back panel which constitutes the emissive flat panel display device of the present invention, wherein FIG. 13A is a plan view and FIG. 13B is a view showing the constitution of one pixel which is formed in the inside of an essential part indicated by a in FIG. 13A. In a display region 700 of the back substrate 601, the above-mentioned cathode electrodes 701 and gate electrodes 702 are arranged in a matrix array. The cathode electrodes 701 and the gate electrodes 702 are electrically insulated from each other by an insulation layer not shown in the drawing and electron sources 703 using nanotubes (here, carbon nanotubes) are provided at respective intersecting portions as shown in FIG. 13B. The electron sources 703 are formed on the cathode electrodes 701 and are exposed from control apertures (described later) formed in the gate electrodes 702.

FIG. 14A and FIG. 14B are schematic explanatory views of a constitutional example of the face panel which constitutes the emissive flat panel display device of the present invention, wherein FIG. 14A is a plan view and FIG. 14B is a view showing an example of the arrangement of phosphor layers which is formed in the inside of an essential part indicated by b in FIG. 14A. Here, although the above-mentioned anode electrode is formed on upper surfaces of the phosphor layers, the anode electrode is omitted from the drawing. The face panel 2 forms a video observation surface and the face substrate 603 is preferably made of glass. To an inner surface of the face substrate 603, the phosphors 801, 802, 803 of three colors consisting of (red), (green) and (blue) which are repeatedly arranged in a stripe shape are provided, and a light shielding layer, that is, a black matrix 804 is arranged on boundaries among respective phosphors 801, 802, 803. Each phosphor 801, 802, 803 is arranged to face the above-mentioned each one pixel having the electron source (here, corresponding to the sub color pixel), that is, each intersecting portion between the cathode electrode and the gate electrode in an opposed manner. The phosphor layer which is constituted of the phosphors 801, 802, 803 and the black matrix 804 is formed in a following manner.

First of all, the black matrix 804 is formed on the face substrate 603 by a known lift-off method. Next, using a known slurry method in the same manner, the phosphors of three colors consisting of red (R), green (G) and blue (B) are sequentially formed such that the respective phosphors are defined by the black matrix 804. Then, the above-mentioned anode electrode is formed to cover the phosphors.

The electron sources and the phosphors formed on the face panel 2 which is manufactured in the above-mentioned manner are positioned with respect to the above-mentioned back panel 1 and, thereafter, the face panel 2 and the back panel 1 are overlapped to each other by way of the sealing frame 3 and are adhered to each other using frit glass. The frit glass is applied to any one or both of respective opposingly facing surfaces of the face panel 2, the back panel 1 and the sealing frame 3 by coating, is heated at a temperature of 450° C., and is cured or hardened due to the ensuing lowering of the temperature. After evacuating an inner space defined by both panels and the sealing frame using an exhaust pipe not shown in the drawing, the exhaust pipe is sealed. It is desirable that the exhaust pipe is formed on a portion of the back substrate 601 or a portion of the sealing frame 3. Then, by applying a video signal to the cathode electrodes, a control signal to the gate electrodes, and an anode voltage (a high voltage) to the anode electrode, it is possible to make the emissive flat panel display device display a desired video (image).

Figure 15:
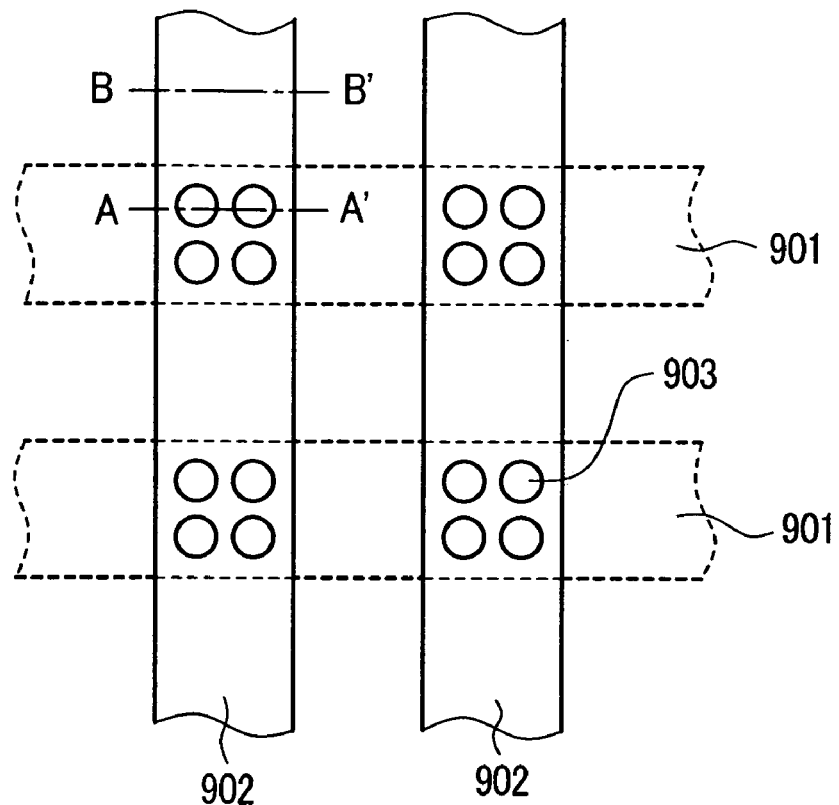
FIG. 15 is a plan view for schematically explaining the structure of an essential part of the back panel.
Figure 16:
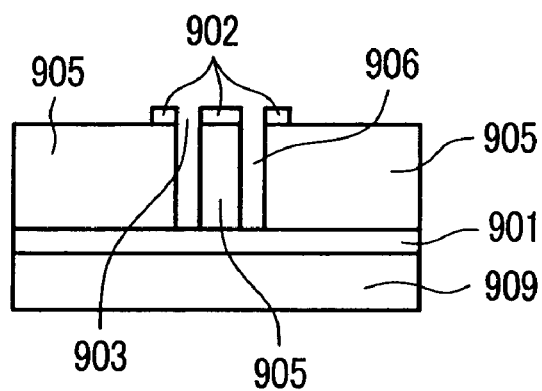
FIG. 16 is a cross-sectional view taken along a line A–A' in FIG. 15.
Figure 17:
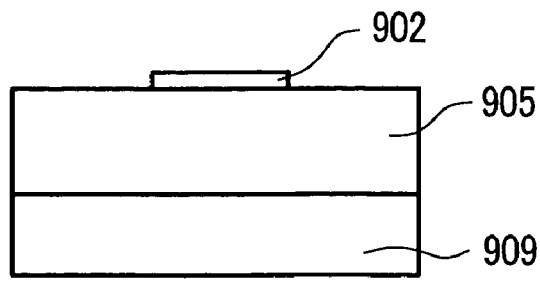
FIG. 17 is a cross-sectional view taken along a line B–B' in FIG. 15.
Figure 18:
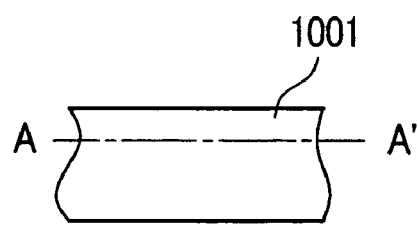
FIG. 18A and FIG. 18B are explanatory views of a process for forming electron sources on a back substrate in the first embodiment of the present invention.
Figure 18:
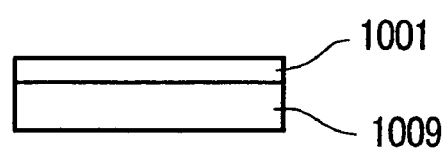
Figure 19:
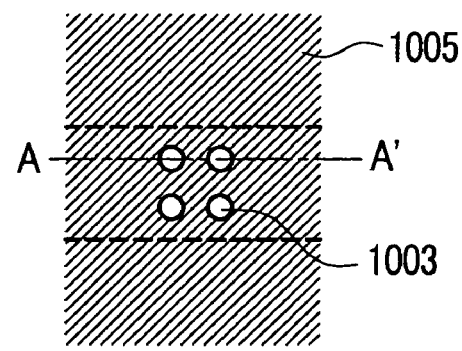
FIG. 19A and FIG. 19B are explanatory views of a process which follows the process shown in FIG. 18A and FIG. 18B for forming the electron sources on the back substrate in the first embodiment of the present invention.
Figure 19:
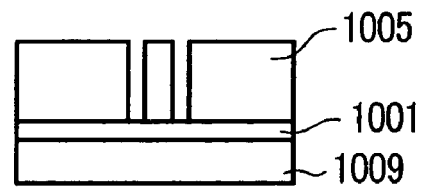
Figure 20:
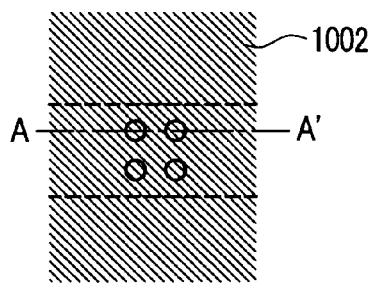
FIG. 20A and FIG. 20B are explanatory views of a process which follows the process shown in FIG. 19A and FIG. 19B for forming the electron sources on the back substrate in the first embodiment of the present invention.
Figure 20:
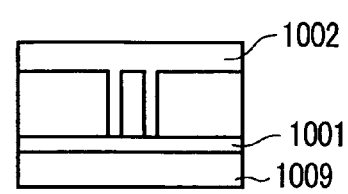

Next, the first embodiment of the detailed structure of the back panel is explained in conjunction with FIG. 15 to FIG. 17. FIG. 15 is a plan view for schematically explaining the structure of an essential part of the back panel and shows a portion where the pixels are provided in a 2×2 array. FIG. 16 is a cross-sectional view taken along a line A–A' in FIG. 15 and FIG. 17 is a cross-sectional view taken along a line B–B' in FIG. 15. In FIG. 15 to FIG. 17, on a surface of the back substrate 909 (corresponding to reference numeral 601 in FIG. 11 and FIG. 12) made of glass, 600 stripe-like cathode electrodes 901 (corresponding to reference numeral 701 in FIG. 11 and FIG. 12) having a thickness of 0.2 to 10 µm and a width of 300 µm are formed at an interval of 60 µm. Next, an insulation layer 905 is formed in a state that the insulation layer 905 covers the cathode electrodes 901. A thickness of the insulation layer 905 is set to 1 to 50 µm. In the pixel portion of the insulation layer, that is, in the intersecting portion of the insulation layer with the gate electrode described later, insulation-layer apertures 906 having a diameter of 1 to 50 µm are formed.

After baking the insulation layer 905, 2400 stripe-like gate electrodes 902 (corresponding to reference numeral 702 in FIG. 11 and FIG. 12) each of which has a thickness of 0.2 to 10 µm and a width of 90 µm are formed at an interval of 30 µm. Control apertures 903 having a diameter of 1 to 50 µm are formed in intersecting portions between the cathode electrodes 901 and the gate electrodes 902. Here, in the intersecting portions between the gate electrode 902 and the cathode electrode 901, the insulation-layer apertures 906 formed in the insulation layer 905 and the control apertures 903 formed in the gate electrode 902 are arranged coaxially and the electron sources made of carbon nanotubes are provided to bottom portions of both apertures, that is, on the cathode electrodes 901.

The above-mentioned face panel is overlapped to the back panel having the electron emission/control structure constituted in the above-mentioned manner and the face panel and the back panel are sealed to each other by the sealing frame thus manufacturing the emissive flat panel display device. Then, by inputting a scanning signal (a video signal) to the cathode electrodes 901, by inputting a gate signal (a control signal) to the gate electrodes 902, and by applying an acceleration voltage to the anode electrodes on the face panel, images which uniformly emit light can be displayed.

Figure 21:
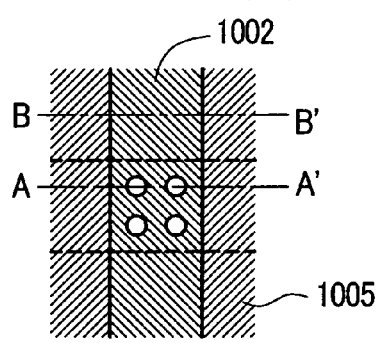
FIG. 21A to FIG. 21C are explanatory views of a process which follows the process shown in FIG. 20A and FIG. 20B for forming the electron sources on the back substrate in the first embodiment of the present invention.
Figure 21:
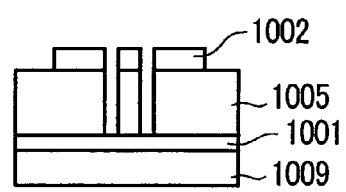
Figure 21:
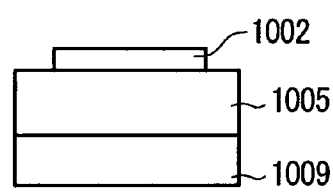

Next, the first embodiment of the process for forming the electron sources on the back substrate is explained in conjunction with FIG. 18A to FIG. 21C. FIG. 18A to FIG. 21C are explanatory views of the process for forming the electron sources on the back substrate in the first embodiment of the present invention. In these drawings, FIG. 18A, FIG. 19A, FIG. 20A and FIG. 21A are top plan views of the electron source portion, FIG. 18B, FIG. 19B, FIG. 20B and FIG. 21B are cross-sectional views taken along lines A–A' in FIG. 18A, FIG. 19A, FIG. 20A and FIG. 21A respectively. Further, FIG. 21C is a cross-sectional view taken along a line B–B' in FIG. 21A.

First of all, as shown in FIG. 18A to FIG. 18B, on a surface of the back substrate 1009 (corresponding to reference numeral 909 in FIG. 16), 600 cathode electrodes 1001 (corresponding to reference numeral 901 in FIG. 15) having a width of 300 µm are formed at an interval of 60 µm. The cathode electrodes 1001 are formed by coating a conductive paste containing carbon nanotubes using screen printing. A thickness of the cathode electrodes 1001 is 1 µm. Next, as shown in FIG. 19A and FIG. 19B, a photosensitive dielectric paste is applied to the whole surface of the cathode electrodes 1001 using screen printing and, thereafter, insulation-layer apertures 1003 (corresponding to the insulation-layer apertures 906 in FIG. 16) which constitute electron source apertures are formed using a usual photolithography process. The photosensitive dielectric paste is baked in the atmosphere at a temperature of 550° C. for 30 minutes thus forming an insulation layer 1005 (corresponding to the insulation layer 905 in FIG. 16). A thickness of the insulation layer 1005 is 10 µm.

As shown in FIG. 20A and FIG. 20B, a photosensitive silver paste is applied to the whole surface of the insulation layer 1005 using screen printing. Using a usual photolithography process, gate electrodes 1002 (corresponding to the gate electrodes 902 in FIG. 16) shown in FIG. 21A to FIG. 21C are formed and, thereafter, the gate electrodes 1002 are baked in the atmosphere at a temperature of 550° C. for 30 minutes thus forming the gate electrodes. A width of the gate electrode 1002 is 90 µm and an interval is 30 µm. 2400 gate electrodes 1002 are formed. Further, a thickness of the gate electrodes 1002 is 5 µm and control apertures having the same size as or slightly larger than the insulation-layer apertures are formed at same portions.

Here, in this embodiment, although the cathode electrodes 1001 and the gate electrodes 1002 are formed of the specified metal, provided that the required electrical conductivity is ensured, any metal or any conductive material can be used for the formation of the cathode electrodes 1001 and the gate electrodes 1002. Further, although the gate electrodes are manufactured using a photolithography method in this embodiment, it is possible to use other method such as the screen printing method. Further, although the electron sources are formed of carbon nanotubes in this embodiment, the carbon nanotubes may be a single-wall type, a multi-wall type or a mixed material of these carbon nanotubes. Further, nanotube made of other material other than carbon can be also used.

Here, with the use of electron sources made of the carbon nanotubes which possesses the electric field strength of 1V/μm to obtain the emission current density of 30 mA/cm$^2$, the electric field strength of 0.6V/μm when the emission current density becomes 1/1000 of the maximum emission current density and the electric field difference of 0.4V/μm, when the diameter of the apertures of the above-mentioned electron sources is 10 μm, the gate operation is realized with the voltage of several volts.

Further, in this embodiment, since the carbon nanotubes having the uniform diameter are used as the material of the electron sources, it is possible to manufacture the electron sources in which on the surface of the whole emission region of each pixel, the average density of carbon nanotubes having the diameter ranging from the minimum diameter to the diameter which is 1.2 times (preferably 1.1 times) as large as the minimum diameter is ten million pieces/cm$^2$ or more. As a result, it is possible to increase the density of the average emission site in the whole emission region of each pixel to one million pieces/cm$^2$ or more, preferably ten million pieces/cm$^2$ or more. Further, it is possible to suppress the irregularities of brightness between neighboring pixels of the emissive flat panel display device to 1% or less.

Here, the density of the above-mentioned emission site can be measured using an electron detection device. When a given voltage is applied between the electron detection device and the electron source, electrons are emitted from the carbon nanotubes which are normally erected within the pixel region of the electron source. The above-mentioned electron detection device is provided with a sensor which has an extremely fine hole for detecting electrons emitted from the electron source. The sensor is arranged such that the extremely fine hole faces the pixel region of the electron source in an opposed manner. Then, by scanning the above-mentioned sensor within the pixel region and by counting the emission distribution (the number of electron emission), it is possible to measure the above-mentioned density of emission site.

Figure 22:
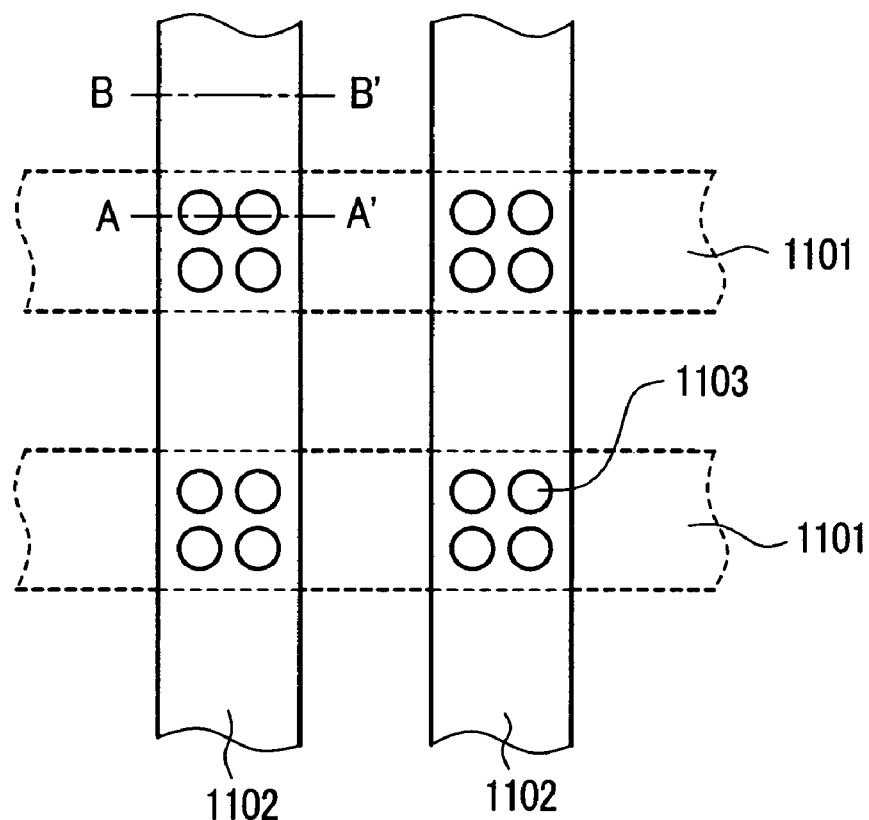
FIG. 22 is a plan view for schematically explaining the structure of an essential part of the back panel of the emissive flat panel display device according to the present invention.
Figure 23:
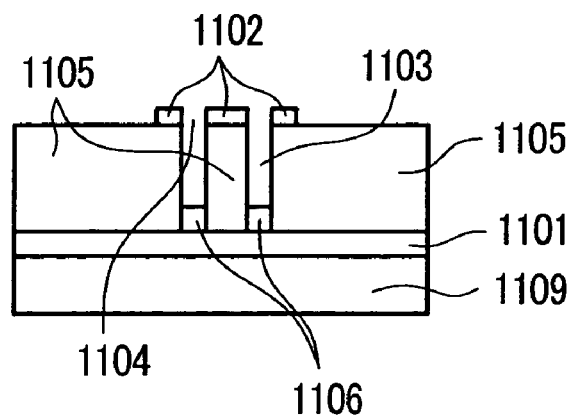
FIG. 23 is a cross-sectional view taken along a line A–A' in FIG. 22.
Figure 24:
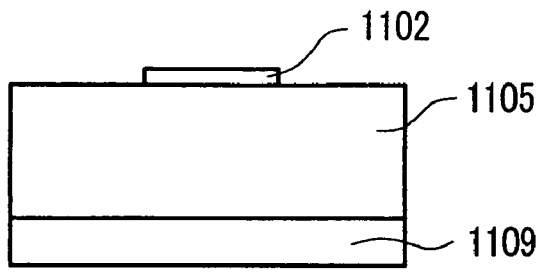
FIG. 24 is a cross-sectional view taken along a line B–B' in FIG. 22.
Figure 25:
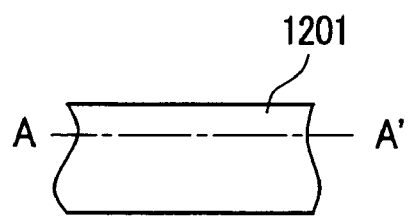
FIG. 25A and FIG. 25B are explanatory views of a process for forming electron sources on a back substrate in the second embodiment of the present invention.
Figure 25:
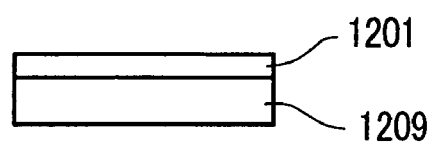
Figure 26:
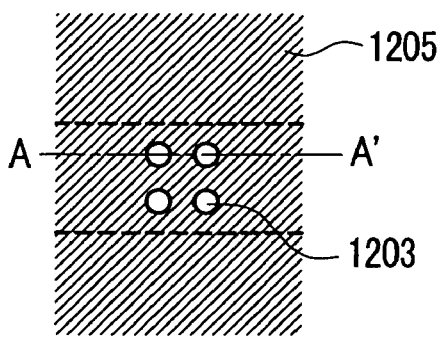
FIG. 26A and FIG. 26B are explanatory views of a process which follows the process shown in FIG. 25A and FIG. 25B for forming the electron sources on the back substrate in the second embodiment of the present invention.
Figure 26:
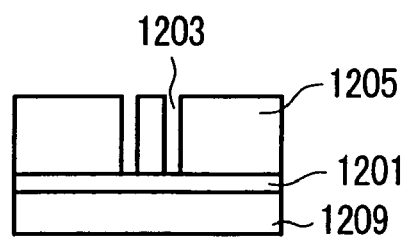
Figure 27:
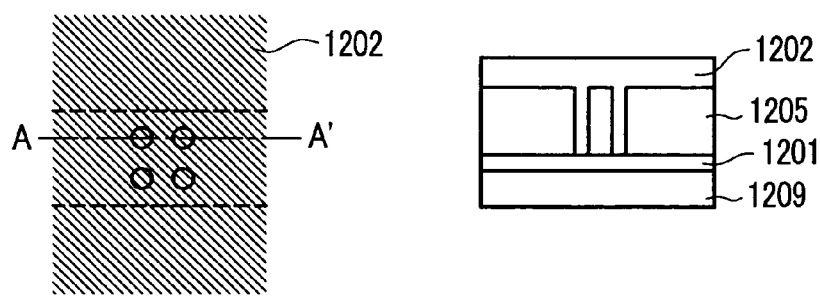
FIG. 27A and FIG. 27B are explanatory views of a process which follows the process shown in FIG. 26A and FIG. 26B for forming the electron sources on the back substrate in the second embodiment of the present invention.

Next, the second embodiment of the detailed structure of the back panel is explained in conjunction with FIG. 22 to FIG. 24. FIG. 22 is a plan view for schematically explaining the structure of an essential part of the back panel of the emissive flat panel display device of the present invention and shows a portion where the pixels are provided in a 2×2 array. FIG. 23 is a cross-sectional view taken along a line A–A' in FIG. 22 and FIG. 24 is a cross-sectional view taken along a line B–B' in FIG. 22. In FIG. 22 to FIG. 24, on a surface of the back substrate 1109 (corresponding to reference numeral 601 in FIG. 11 and FIG. 12) preferably made of glass, 600 cathode electrodes 1101 (corresponding to reference numeral 901 in FIG. 15 to FIG. 17) having a thickness of 0.2 to 10 μm and a width of 300 μm are formed at an interval of 60 μm. Next, an insulation layer 1105 is formed in a state that the insulation layer 1105 (corresponding to reference numeral 905 in FIG. 15 to FIG. 17) covers the cathode electrodes 1101. A thickness of the insulation layer 1105 is set to 1 to 50 μm. In the pixel portion of the insulation layer, that is, in the intersecting portion of the insulation layer with the gate electrode described later, insulation-layer apertures 1103 having a diameter of 1 to 50 μm are formed.

After baking the insulation layer 1105, 2400 gate electrodes 1102 (corresponding to reference numeral 902 in FIG. 15 to FIG. 17) each of which has a thickness of 0.2 to 10 μm and a width of 90 μm are formed on the insulation layer 1105 at an interval of 30 μm. Control apertures 1104 having a diameter of 1 to 50 μm are formed in intersecting portions between the cathode electrodes 1101 and the gate electrodes 1102. Here, in the intersecting portions between the gate electrode 1102 and the cathode electrode 1101, the insulation-layer apertures 1103 formed in the insulation layer 1105 and the control apertures 1104 formed in the gate electrode 1102 are arranged coaxially and the electron sources 1106 made of carbon nanotubes are provided to bottom portions of both apertures, that is, on the cathode electrodes 1101.

The above-mentioned face panel is overlapped to the back panel having the electron emission/control structure constituted in the above-mentioned manner and the face panel and the back panel are sealed to each other by the sealing frame thus manufacturing the emissive flat panel display device. Then, by inputting a scanning signal (a video signal) to the cathode electrodes 1101, by inputting a gate signal (a control signal) to the gate electrodes 1102, and by applying an acceleration voltage to the anode electrodes on the face panel, images which uniformly emit light can be displayed.

Figure 28:
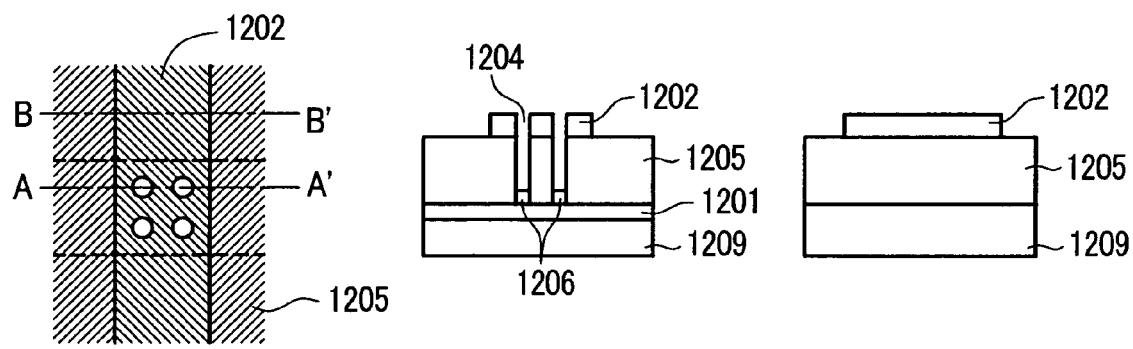
FIG. 28A to FIG. 28C are explanatory views of a process which follows the process shown in FIG. 27A and FIG. 27B for forming the electron sources on the back substrate in the second embodiment of the present invention.

Next, the second embodiment of the process for forming the electron sources on the back substrate is explained in conjunction with FIG. 25A to FIG. 28C. FIG. 25A to FIG. 28C are explanatory views of the process for forming the electron sources on the back substrate in the second embodiment of the present invention. In these drawings, FIG. 25A, FIG. 26A, FIG. 27A and FIG. 28A are top plan views of the electron source portion, FIG. 25B, FIG. 26B, FIG. 27B and FIG. 28B are cross-sectional views taken along lines A–A' in FIG. 25A, FIG. 26A, FIG. 27A and FIG. 28A respectively. Further, FIG. 28C is a cross-sectional view taken along a line B–B' in FIG. 28A.

First of all, as shown in FIG. 25A to FIG. 25B, on the back substrate 1209 (corresponding to reference numeral 1109 in FIG. 22 to FIG. 24), 600 cathode electrodes 1201 (corresponding to reference numeral 1101 in FIG. 22 to FIG. 24) having a width of 300 μm are formed at an interval of 60 μm. The cathode electrodes 1201 are formed by coating a photosensitive silver paste using screen printing. A thickness of the cathode electrodes 1201 is 1 μm. Next, as shown in FIG. 26A and FIG. 26B, an insulation layer 1205 is formed using screen printing. Thereafter, insulation-layer apertures 1203 (corresponding to the insulation-layer apertures 1103 in FIG. 23) which constitute electron source apertures are formed using a usual photolithography process. The insulation layer 1205 is baked in the atmosphere at a temperature of 550° C. for 30 minutes thus forming an insulation layer 1205. A thickness of the insulation layer 1205 is 10 μm.

As shown in FIG. 27A and FIG. 27B, a photosensitive silver paste is applied to the whole surface of the insulation layer 1205 using screen printing. Using a usual photolithography process, gate electrodes 1202 shown in FIG. 28A to FIG. 28C are formed and, thereafter, the gate electrodes 1202 are baked in the atmosphere at a temperature of 550° C. for 30 minutes thus forming the gate electrodes. A width of the gate electrode 1202 is 90 μm and an interval is 30 μm. 2400 gate electrodes 1202 are formed. Further, a thickness of the gate electrodes 1202 is 5 μm and control apertures having the same size as or slightly larger than the insulation-layer apertures are formed at same portions. Finally, ink containing carbon nanotubes is applied to bottom portions of the insulation-layer apertures using an ink jet method thus forming electron sources 1206.

Here, in this embodiment, although the cathode electrodes 1201 and the gate electrodes 1202 are formed of the specified metal, provided that the required electrical conductivity is ensured, any metal or any conductive material can be used for the formation of the cathode electrodes 1201 and the gate electrodes 1202. Further, although the gate electrodes are manufactured using a photolithography method in this embodiment, it is possible to use other method such as the screen printing method. Further, the ink containing the carbon nanotubes is applied using an ink jet method in this embodiment, the ink may be applied using other coating method such as screen printing or the like. Further, the carbon nanotubes may be a single-wall type, a multi-wall type or a mixed material of these types. Further, nanotubes made of a material other than carbons may be also used.

Here, with the use of electron sources made of the carbon nanotubes which possesses the electric field strength of $1V/\mu m$ to obtain the emission current density of $30 \text{ mA/cm}^2$, the electric field strength of $0.6V/\mu m$ when the emission current density becomes $\frac{1}{1000}$ of the maximum emission current density and the electric field strength difference of $0.4V/\mu m$, when the diameter of the apertures of the above-mentioned electron sources is $10 \text{ } \mu m$, the gate operation is realized with the voltage of several volts.

Further, in this embodiment, since the carbon nanotubes having the uniform diameter are used as the material of the electron sources, it is possible to manufacture the electron sources in which on the surface of the whole emission region of each pixel, the average density of carbon nanotubes having the diameter ranging from the minimum diameter to the diameter which is 1.2 times (preferably 1.1 times) as large as the minimum diameter is ten million pieces/cm$^2$ or more. As a result, it is possible to increase the density of the average emission site in the whole emission region of each pixel to one million pieces/cm$^2$ or more, preferably ten million pieces/cm$^2$ or more. Further, it is possible to suppress the irregularities of brightness between neighboring pixels of the emissive flat panel display device to 1% or less.

As has been explained heretofore, according to the present invention, it is possible to provide the emissive flat panel display device which enables the gate operation, that is, the electron fetching control at the relatively low voltage of several volts to several tens volts. Further, it is possible to increase the density of the average emission site in the whole emission region of each pixel to one million pieces/cm$^2$ or more, preferably ten million pieces/cm$^2$ or more thus restricting the irregularities of brightness between the neighboring pixels (or neighboring sub pixels) to 1% or less thus providing the emissive flat panel display device capable of performing the high quality image display.

What is claimed is:

1. An emissive flat panel display device comprising:
   a back panel which includes a plurality of cathode electrodes which extend in the first direction and are arranged in the second direction which intersects the first direction and has a large number of electron sources made of nanotubes, and a plurality of gate electrodes which extend in the second direction and are arranged in parallel in the first direction with respect to the cathode electrodes by way of an insulation layer and controls fetching of electrons from the electron sources, wherein a display region is constituted of a large number of pixels which are formed on intersecting portions between the cathode electrodes and the gate electrodes, and
   a face panel which includes phosphor layers of a plurality of colors which emit light upon excitation of electrons fetched from the electron sources formed on the display region of the back panel and anode electrodes, wherein
   an average density of the nanotubes having a diameter ranging from the minimum diameter to a diameter which is 1.2 times as large as the minimum diameter in emission regions of the pixels is ten million pieces/cm$^2$ or more.

2. An emissive flat panel display device according to claim 1, wherein the pixel is constituted of sub pixels of red, green and blue and electron source of each sub pixel includes one or a plurality of emission regions.

* * * * *